US006287616B1

(12) United States Patent
Beeson et al.

(10) Patent No.: US 6,287,616 B1
(45) Date of Patent: *Sep. 11, 2001

(54) COLD WATER SOLUBLE CREAMER

(75) Inventors: Christine A. Beeson, Marysville; Linda Erickson, Dublin, both of OH (US)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/697,226

(22) Filed: Aug. 21, 1996

(51) Int. Cl.$^7$ .................................................. A23C 9/16
(52) U.S. Cl. .................... 426/285; 426/471; 426/588; 426/453
(58) Field of Search .................................. 426/588, 285, 426/471, 453, 591

(56) References Cited

U.S. PATENT DOCUMENTS

| | | | | |
|---|---|---|---|---|
| 2,835,586 | * | 5/1958 | Peebles | 426/285 |
| 3,042,526 | * | 7/1962 | Spiess | 426/285 |
| 3,100,909 | * | 8/1963 | Schapiro | 426/285 |
| 3,116,150 | * | 12/1963 | Baker | 426/285 |
| 3,120,438 | * | 2/1964 | McIntire | 426/285 |
| 3,126,289 | * | 3/1964 | Spilman | 426/285 |
| 3,164,473 | * | 1/1965 | Shields | 426/285 |
| 3,238,645 | * | 3/1966 | Damesch | 426/285 |
| 3,300,315 | * | 1/1967 | Nava | 426/285 |
| 3,653,911 | * | 4/1972 | Mancuso | 426/285 |
| 3,958,031 | | 5/1976 | Fleck et al. | 426/579 |
| 4,021,582 | * | 5/1977 | Hsu | 426/285 |
| 4,239,786 | | 12/1980 | Gilmore et al. | 426/601 |
| 4,242,364 | * | 12/1980 | Buddemeyer | 426/658 |
| 4,318,932 | * | 3/1982 | Ewing | 426/285 |
| 4,438,147 | * | 3/1984 | Hedrick | 426/471 |
| 4,492,714 | | 1/1985 | Cooper et al. | 426/602 |
| 4,640,839 | * | 2/1987 | Hsu | 426/285 |
| 4,737,369 | | 4/1988 | Asano et al. | 426/98 |
| 4,743,402 | | 5/1988 | Fick | 260/412.2 |
| 4,810,518 | * | 3/1989 | Haisman | 426/579 |
| 5,260,077 | | 11/1993 | Carrick et al. | 426/73 |
| 5,284,674 | * | 2/1994 | Fazio | 426/585 |
| 5,350,590 | * | 9/1994 | McCarthy | 426/285 |
| 5,366,751 | * | 11/1994 | Pordy | 426/585 |
| 5,400,972 | | 3/1995 | Maier et al. | 239/422 |
| 5,480,670 | * | 1/1996 | Pordy | 426/585 |
| 5,554,400 | * | 9/1996 | Stipp | 426/285 |

FOREIGN PATENT DOCUMENTS

| | | |
|---|---|---|
| 895225 | 3/1972 | (CA) . |
| 1 134 269 | 8/1962 | (DE) . |
| 0 012 499 | 6/1980 | (EP) . |
| 0 239 378 | 3/1987 | (EP) . |
| 0 323 753 B1 | 7/1989 | (EP) . |
| 0 780 055 A2 | 6/1997 | (EP) . |
| 74 29265 | 8/1975 | (FR) . |
| 59-118043 | 7/1984 | (JP) . |
| 2-207764 | 8/1990 | (JP) . |
| 1139 | 2/1986 | (KR) . |
| WO 96/08153 | 3/1996 | (WO) . |

OTHER PUBLICATIONS

Swern 1979 Baileys Industrial Oil and Fat Products vol. 1, $4^{th}$ed. John Wiley & Sons, New York p. 368–371.*
WPI/Derwent, Japanese Abstract for JP54–113471, Sep. 5, 1979, "Fatty Product Easy Disperse Cold Water Produce Blend, Fatty Product Powder Fatty Acid Ester Cane Sugar", of Mitsubishi Chem Ind. Ltd.

* cited by examiner

*Primary Examiner*—Carolyn Paden
(74) *Attorney, Agent, or Firm*—Winston & Strawn

(57) ABSTRACT

A powdered creamer which made up of agglomerated creamer particles. The creamer particles are each made up of a sweetener, a water-dispersible or water-soluble protein and an edible oil having a bland flavor and a melting point below 10° C. The powdered creamer is soluble in cold water.

19 Claims, No Drawings

COLD WATER SOLUBLE CREAMER

FIELD OF THE INVENTION

This invention relates to a powdered creamer which is soluble in cold water and to methods for the production of the creamer. For this invention water is considered to be cold if it is at a temperature of 30° C. or less.

BACKGROUND TO THE INVENTION

Powdered non-dairy creamers are well known and are widely used; particularly as coffee or tea creamers. Typically these creamers contain about 35 to 50% by weight of fat, about 25 to 40% by weight of a sugar-based sweetener, about 3 to 10% of a protein, and emulsifiers, stabilizers and buffers. However the amount of the sweetener may increase to about 70% if sugars such as corn syrup are used. The powdered creamers are typically produced by subjecting a solution containing the components to spray-drying.

The fat used is usually a fat or oil which is bland or neutral in flavor and which remains stable over long periods. Coconut fat, in particular, has been widely used. The protein used is usually a milk based protein such as casein; often in the form of sodium caseinate. Corn syrups are commonly used as the sugar-based sweetener.

When dissolved in hot water, these powdered creamers dissolve rapidly to whiten the beverage and provide a creamy mouthfeel. However, when these creamers are added to cold water, for example at about 20° C., they are usually at best sparingly soluble. Usually the powdered creamer merely floats on the surface of the liquid; even with stirring. This makes these powdered creamers unsuitable for use in cold beverages. However, many beverages which are usually drunk hot are now being made and consumed at temperatures below about 30° C. Further, many beverage powders, such as those which provide milk-type drinks when reconstituted, are intended to be dissolved in cold liquid. If the beverage powder is to contain the creamer as well, the creamer must be soluble in cold water.

One attempt to deal with the problem is disclosed in Korean patent publication 86-121. The patent discloses the application of 0.5 to 2% by weight of lecithin and 0.5 to 3% by weight of a medium chain triglyceride to the surface of a powdered coffee creamer. The medium chain triglyceride and the lecithin are described to improve the wettability of the powdered coffee creamer and hence the dissolution time in cold water. However, it is often undesirable to coat powders with oily material and medium chain triglycerides greatly add to the cost of the creamer.

Therefore there remains a need for an acceptable powdered creamer which is able to dissolve in cold water.

SUMMARY OF THE INVENTION

It is an object of the invention to provide a powdered creamer which is soluble in cold water.

Accordingly this invention provides a powdered creamer which comprises agglomerated creamer particles, the creamer particles each comprising a sweetener, a water-dispersible or water-soluble protein and an edible oil having a bland flavor and a melting point below 10° C.

It is surprisingly found that if a low melting point oil is used as the oil component of the creamer particles and the creamer particles are then agglomerated, the resulting powdered creamer has excellent solubility in cold water. For example, the powdered creamer is able to dissolve in water at a temperature of about 20° C. in about 40 seconds or less. Conventional powdered creamers usually do not dissolve at all in water at a temperature of about 20° C. and hence the invention provides a significant improvement.

Preferably, the edible oil has a melting point of less than about 5° C.; for example about 0° C. to about 2° C. Further, the edible oil is preferably a vegetable oil which contains high levels of mono-unsaturates; for example a vegetable oil in which the fatty acid moieties in the triglyceride comprise at least about 70% by weight of oleic acid and less than about 20% by weight of linoleic acid.

Especially preferred is a vegetable oil in which the fatty acid moieties in the triglyceride comprise at least about 80% by weight of oleic acid and the mass ratio of oleic acid to linoleic acid is about 1:0.01 to about 1:0.09. Sunflower or canola oil which has a melting point of about 0° C. to about 2° C. and which contains at least 85% by weight of oleic acid is particularly suitable.

The edible oil is preferable present in an amount of about 25% to about 45% by weight of the powdered creamer; more preferably about 30% to about 36% by weight.

The creamer particles may further comprise an emulsifier; preferably in an amount of about 0.5% to about 1.5% by weight of the powdered creamer. The emulsifier is preferably a mixture of distilled monoglycerides and diacetyl tartaric acid esters of mono-diglycerides. Further, the powdered creamer may include a surface coating of an emulsifier; for example lecithin.

The powdered creamer preferably has a particle size greater than about 1.5 mm; more preferably greater than about 1.65 mm.

The powdered creamer may include entrapped gas which causes foaming upon dissolution of the powdered creamer.

In another aspect, this invention provides a process for the preparation of a powdered creamer, the process comprising forming a solution of a sweetener, a water-dispersible or water-soluble protein and an edible oil having a bland flavor and a melting point below 10° C.; drying the solution to form creamer particles; and agglomerating the creamer particles to provide the powdered creamer.

The invention also provides a powdered creamer obtained by the process.

DETAILED DESCRIPTION OF THE INVENTION

Embodiments of the invention are now described by way of example only. The powdered creamer is made up of agglomerated creamer particles which each contain sweetener, protein and oil.

The sweetener used in the creamer particles may be any suitable food grade sweetener; for example those conventionally used in the production of powdered creamers. Examples of suitable sweeteners are sugars such as corn syrup, sucrose, dextrose, fructose, maltodextrin, and the like, and mixtures of these sugars. Corn syrup is particularly suitable (especially dried corn syrup solids) since corn syrup adds bulk to the powdered creamer without imparting excessive sweetness. Maltodextrin, either alone or in combination with other sugars, may also be used; particularly if a product having less sweetness is desired. In any event, the particular sweetener or combination of sweeteners selected is not critical; the primary determining factors being the desired taste, sweetness and bulk. The amount of sweetener used will vary depending upon the sweetener, the desired level of sweetness and the strength of the sweetener; but preferably comprises about 30 to about 70% by weight of the powdered creamer.

The sweetener may also contain artificial sweeteners such as saccharin, cyclamates, acetosulfame, L-aspartyl based sweeteners such as aspartame, and mixtures of these. If an artificial sweetener is used, it is suitably combined with bulking agents such as maltodextrins and polydextrose. In this case, the total amount of sweetener and bulking agent is usually in the range of about 40 to about 70% by weight; artificial sweetener itself usually comprising less than 1% by weight.

The protein may be selected from any suitable water-dispersible or soluble protein; for example those normally used in powdered creamers. Examples of such proteins are soy protein, non-fat milk solids, whey solids, casein salts such as sodium and calcium caseinate, rice protein, wheat protein, oat protein, and the like. Mixtures of the various proteins may also be used. Sodium caseinate is most commonly used. The protein is preferably present in an amount of about 0.5 up to about 6% by weight. If the protein source is not pure protein, a greater amount of the protein source may be required to obtain the desired protein level.

The edible oil may be any suitable oil which is stable, bland in flavor, and which has a melting point below about 10° C. The edible oil may also be hydrogenated. Particularly suitable are vegetable oils which have high levels of mono-unsaturates; for example vegetable oils in which the fatty acid moieties in the triglyceride comprise at least about 70% by weight of oleic acid and less than about 20% by weight of linoleic acid. Especially preferred are vegetable oils in which the fatty acid moieties in the triglyceride comprise at least about 80% by weight of oleic acid and the mass ratio of oleic acid to linoleic acid is about 1:0.01 to about 1:0.09. The edible oil is preferable present in an amount of about 25% to about 45% by weight of the powdered creamer.

A suitable example of such an edible oil is the sunflower oil described in U.S. Pat. No. 4,743,402; the disclosure of which is incorporated by reference. Such a sunflower oil is available from SVO Specialty Products Inc. of Eastlake, Ohio 44095, USA under the trade mark TRISUN EXTRA. This oil contains 85% oleic acid, has an Iodine Value (Wijis) of about 75 to 85, a Mettler Drop Point of 0° C., an AOM Stability of about 60 hours and a smoke point of about 238° C. Another suitable example of such an edible oil is the canola or rapeseed oil disclosed in European patent application 0 323 753, the disclosure of which is incorporated by reference. Another edible oil which may be used is the soybean oil commercially available under the trade mark DURKEE 500 from Loders Croklaan of Lisle, Ill., USA. Although perfectly functional, the soybean oil is less preferred in many applications since it may impart a slight "beany" taste. These oils may also be hydrogenated if desired.

If desired or required, the edible oil may contain an effective amount of an acceptable antioxidant; for example about 100 ppm to about 3000 ppm of tocopherol. Other suitable lipophilic antioxidants may also be used.

The creamer particles may also contain suitable emulsifiers as desired. Suitable emulsifiers may be selected from monoglycerides, distilled monoglycerides, diglycerides, glycerol monostearates, sorbitol monostearates, esters or carbocyclic acids with mono- and di-glycerides, monosodium phosphate derivatives of mono- and di-glycerides, lecithin, diacetyl tartaric acid esters of mono-diglycerides (data esters), sorbitan esters, diacetyl tartaric acids esters of mono- and di-glycerides, succinylated mono- and di-glycerides, acetylated mono- and di-glycerides, hydroxylated lecithin, propylene glycol mono- and di-esters of fatty acids, polyglycerol esters of fatty acids, lactylic esters of fatty acids, and mixtures thereof. Non fat milk solids may also be used as an emulsifier.

Particularly preferred are succinylated monoglycerides, distilled monoglycerides (for example those commercially available under the trade name of DIMODAN S and obtainable from Grindsted Products, Inc of Kansas, USA) and diacetyl tartaric acid esters of mono-diglycerides (for example those commercially available under the trade name of PANODAN SD and obtainable from Grindsted Products, Inc). The diacetyl tartaric acid esters of mono-diglycerides are commonly known as data esters. The DIMODAN S distilled monoglycerides have a monoester content of at least 90%, an iodine value of about 50, a maximum free fatty acid content of about 1.5% and a melting point of about 55° V. The PANODAN SD data esters have a saponification value of about 380 to about 425, an acid value of about 62 to 76, and an iodine value of about 80.

A mixture of distilled monoglycerides and data esters is particularly preferred. The amount of emulsifier may be selected as required and desired. However the emulsifier is preferably present in an amount of about 0.5% to about 1.5% by weight of the powdered creamer. If non fat milk solids are used as an emulsifier, amounts up to about 35% by weight may be required.

The creamer particles may also contain suitable buffers (for example dipotassium phosphate and sodium citrate) flavoring agents, coloring agents, flowing agents, antioxidants, and the like as is conventional. A suitable flowing agent is sodium silica aluminate.

The creamer particles may be produced by spray drying as is conventional. For example, an aqueous solution may be prepared by dissolving in water any buffers and salt forming agents that are used. Usually the water is hot; for example at a temperature of about 70° C. to about 90° C. Then the protein is dissolved or dispersed in the aqueous solution. A mixture of the edible oil and the emulsifiers may then be added to the aqueous solution; followed by the sweetener. The resulting emulsion is then mixed until all components have dissolved or dispersed.

Usually the emulsion is then pasteurized and homogenized. The homogenized emulsion is then pumped to a spray tower and spray-dried. The creamer particles obtained preferably have a moisture content of about 2% to about 3% by weight.

A surface emulsifier may then be sprayed on the creamer particles at this point if desired. The surface emulsifier may be any suitable food grade emulsifier; for example lecithin or a mixture of lecithin and medium chain triglycerides as described in Korean patent publication 86-121. Although not essential, the surface emulsifiers are found to improve the wettability of the powdered creamer. The surface emulsifiers may be sprayed on the creamer particles using any suitable spraying technique.

The creamer particles are then agglomerated in an agglomeration tower. Any suitable agglomeration procedure may be used; for example, using the procedure described in U.S. Pat. No. 5,400,972 (the disclosure of which is incorporated by reference). Conveniently, steam or water is used as the agglomeration agent. Agglomerated particles leaving the tower which are of a size below a certain selected size may be returned to the tower. Preferably, the agglomerated particles have a size larger than about 1.5 mm; for example larger than 1.68 mm (No 12 US Sieve). The agglomerated particles form the powdered creamer.

Instead of spraying the surface emulsifier on the creamer particles prior to agglomeration as described above, it is also possible to spray the surface emulsifier on the particles during or after agglomeration.

The powdered creamer may be used as a creaming or whitening agent in a variety of beverages such as coffee and tea. It may also be used as a component of soluble beverage powders which are intended to be dissolved in cold water or milk; for example malted drink powders, chocolate drink powders, milkshake powders, fruit flavored powders, and the like.

It will be appreciated that various modifications may be made to the described embodiments without departing from the invention. For example, it is possible to inject gas into the pasteurized and homogenized creamer emulsion prior to spray drying. The gas may be, for example, air, nitrogen or carbon dioxide and may be injected at a pressure of about 100 kPa to about 2.5 MPa above the pressure of the emulsion. In this way, the creamer particles obtained after spray drying will contain entrapped gas. Upon reconstitution, the entrapped gas will be released, causing the beverage to foam. This variation will be suitable for soluble beverage powders intended to produce milk shake beverages and foaming coffee mixes, for example.

Instead of entrapping gas into the creamer particles, it is also possible to add foaming agents to the soluble beverage powder. A suitable foaming agent is a mixture of a food grade acidulant and an alkali metal carbonate or bicarbonate. For example, a mixture of citric acid and potassium bicarbonate.

It is also possible to include thickening agents in the soluble beverage powder to provide a beverage of a thicker or heavier consistency. Suitable thickening agents are well known in the art.

EXAMPLES

In the following examples, the following abbreviations are used:

| | |
|---|---|
| Datem | Data esters |
| DK Ester | Sucrose fatty acid ester F-160 obtained from Montello of Tulsa Oklahoma, USA |
| DMG | Distilled monoglycerides |
| SMG | Succinylated monoglycerides |
| Trisun | Sunflower oil sold under the name TRISUN EXTRA |

Example 1

Water at about 82° C. (180° F.) is filled into mixing tank. The amount of water used is selected to give a final desired solids concentration. A mixture of dipotassium phosphate and sodium citrate as buffer is added to the mixing tank in an amount to provide about 1.9% by weight of the resulting creamer particles and the solution is mixed for 2 minutes. Sodium hydroxide is added to the aqueous solution in the tank under mixing in an amount to provide about 0.1% by weight of the resulting creamer particles and the solution is mixed for 3 minutes. Casein in an amount to provide about 2.4% by weight of the resulting creamer particles is then added to the aqueous solution under mixing.

In a separate mixer, emulsifiers are mixed with an edible oil at a temperature of about 71° C. (160° F.). The emulsifiers are present in an amount to provide about 0.5 to about 1.5% by weight of the resulting creamer particles while the edible oil is present in an amount to provide about 32% to about 34% by weight of the resulting creamer particles. The oil/emulsifier mixture is then added to the aqueous solution in the mixing tank under stirring. Corn syrup is added to the mixture in the mixing tank in an amount to provide about 61.5% to about 63% by weight of the resulting creamer particles. The mixture is stirred until all components have dissolved or completely dispersed.

The mixture is pasteurized at about 78° C. (172° F.) for about 1 minute and 30 seconds and then homogenized in two stages at about 71° C. (160° F.); the first stage at 20.7 MPa (3000 psi) and the second stage at about 3.45 MPa (500 psi). The solution is then pumped to a spray tower and spray-dried to provide a powder of creamer particles containing about 2% to about 3% by weight moisture.

The creamer particles are then fed to an agglomeration tower. The creamer particles are introduced into the tower through a two jet nozzle using air at a temperature of about 121° C. (250° F.). Steam at about 10 kPa (1.5 psi) is used as the agglomeration agent in the tower and the pressure in the chamber of the agglomeration tower is about 7 kPa (1 psi). The agglomerated powder is then spray coated by spraying lecithin onto the powder. The agglomerated powder is used as the powdered creamer.

A teaspoon of each powdered creamer is added to about 150 ml of coffee at about 21° C. (70° F.) and the beverage stirred. The time taken for the powdered creamer to dissolve is determined. The results are as follows:

| Sample | Oil | Emulsifiers | Solubility Index | Dissolution time/s |
|---|---|---|---|---|
| C1 | Coconut (m.p. 24° C.) | SMG @ 1.5% DK Ester @ 0.5% | 2 | >90 |
| C2 | Coconut (m.p. 24° C.) | DK ester @ 0.5% | 2 | >90 |
| 1 | Trisun | SMG @ 1.5% DMG @ 0.5% | 3 | 50 |
| 2 | Trisun | Datem @ 0.97% DMG @ 0.39% | 5 | 40 |
| 3 | Canola (m.p. 0° C.) | Datem @ 0.97% DMG @ 0.39% | 5 | 40 |

The solubility index varies from 1, which indicates that the powder is insoluble, to 5, which indicates that the powder is very soluble.

The results indicate that the samples containing the edible oils of low melting point have significantly improved cool water solubility. In particular, they dissolve in less than 1 minute which is more than acceptable.

Example 2

The agglomerated powdered creamer of sample 2 is sieved through a sieve set having openings of 2.83 mm (a No 7 US Sieve), 2.00 mm (a No 10 US Sieve), 1.68 mm (a No 12 US Sieve), 1.19 mm (a No 16 US Sieve), and 0.595 mm (a No 30 US Sieve). The powdered creamer collected above each the sieve are separately dissolved in coffee at about 20° C. The results are as follows:

| Particle size/mm | Wetting time/s |
|---|---|
| >2.83 | 10 |
| 2.83–2.00 | 9 |
| 2.00–1.68 | 9 |

-continued

| Particle size/mm | Wetting time/s |
|---|---|
| 1.68–1.19 | 9 |
| 1.19–0.595 | 45 |

The powdered creamers having particle sizes larger than about 1.2 mm are wetted and hence dissolve much more rapidly than powdered creamer having the smaller particle size.

Example 3

A powder creamer is produced as described in example 1 but containing about 62% by weight corn syrup, about 33% by weight of sunflower oil (TRISSUN EXTRA), about 2% by weight of casein and about 1% by weight of succinylated monoglyceride. The agglomerated powder has a particle size above about 1.68 mm.

A teaspoon of the powdered creamer is added to about 150 ml of coffee at about 21° C. (70° F.) and the beverage stirred. The time taken for the powdered creamer to dissolve is determined to be about 40 seconds; indicating excellent solubility in cold water.

Example 4

A powder creamer is produced as described in example 1 containing sunflower oil (TRISUN EXTRA), casein, about 0.2% by weight of DMG and 0.3% by weight of Datem. Further, prior to spray drying, nitrogen gas is injected into the mixture at a pressure of about 1.4 MPa to about 2.1 MPa gauge and the mixture is run through a static mixture.

The powdered creamer has a powder density of about 180 to about 220 g/l. A teaspoon of the powdered creamer is added to about 150 ml of coffee at about 21° C. (70° F.) and the beverage stirred. The powdered creamer dissolves rapidly to form a beverage having a layer of foam on its upper surface.

Example 5

The procedure of example 4 is repeated except that 35% by weight of non-fat milk solids are added as the emulsifier. Due to the large amount of the emulsifier, the amount of corn syrup is reduced to about 30% by weight.

The powdered creamer has a powder density of about 180 to about 220 g/l. A teaspoon of the powdered creamer is added to about 150 ml of coffee at about 21° C. (70° F.) and the beverage stirred. The powdered creamer dissolves rapidly to form a beverage having a layer of foam on its upper surface.

What is claimed is:

1. A powdered creamer which comprises agglomerated creamer particles that contain a sweetener, a water-dispersible or water-soluble protein, an edible oil having a bland flavor and a melting point that is below 10° C., and entrapped gas in an amount effective to cause foaming upon dissolution of the powdered creamer.

2. The powdered creamer of claim 1, wherein the edible oil as a melting point of less than about 5° C.

3. The powdered creamer of claim 1, wherein the edible oil is a vegetable oil in which fatty acid moieties in the triglyceride of the vegetable oil comprise at least about 70% by weight of oleic acid but less than about 20% by weight of linoleic acid.

4. The powdered creamer of claim 3, wherein the fatty acid moieties in the triglyceride comprise at least about 80% by weight of oleic acid and having a mass ratio of oleic acid to linoleic acid of about 1:0.01 to about 1:0.09.

5. The powdered creamer of claim 1, wherein the edible oil is sunflower or canola oil which has a melting point of about 0° C. to about 2° C. and in which fatty acid moieties in the edible oil comprise at least about 85% by weight of oleic acid.

6. The powdered creamer of claim 1, wherein the edible oil is present in an amount of about 25 to 45% by weight of the powdered creamer.

7. The powdered creamer of claim 1, wherein the sweetener is present in an amount of about 40 to 70% by weight of the powdered creamer.

8. The powdered creamer of claim 1, wherein the protein is present in an amount of about 0.5 to 6% by weight of the powdered creamer.

9. The powdered creamer of claim 1, further comprising an emulsifier in an amount of about 0.5 to 1.5% by weight of the powdered creamer.

10. The powdered creamer of claim 9, wherein the emulsifier is a monoglyceride, a distilled monoglyceride, a diglyceride, a glycerol monostearate, a sorbitol monostearate, an ester or caboxylic acid with a mono- or di-glyceride, a monosodium phosphate derivative of a mono- or di-glycericde, a sorbitan ester, a diacetyl tartaric acid ester of a mono- or di-glyceride, a succinylated mono- or di-glyceride, an acetylated mono- or di-glyceride, hydroxylated lecithin, a propylene glycol mono- or di-ester of a fatty acid, a polyglycerol ester of a fatty acid, a lactylic ester of a fatty acid or a mixture thereof.

11. The powdered creamer of claim 9, wherein the emulsifier is a succinylated monoglyceride or a mixture of a distilled monoglyceride and a diacetyl tararic acid ester of a monoglyceride.

12. The powdered creamer of claim 9, wherein the emulsifier is provided on the surface of the particles.

13. The powdered creamer of claim 1, having a particle size that is greater than about 1.5 mm.

14. The powdered creamer of claim 1, having a water content of 2 to 3% and being able to dissolve in 20° C. water in about 40 seconds or less.

15. The powdered creamer of claim 1, further comprises one of more of a buffer, a flavoring agent, a coloring agent, a thickening agent, a flowing agent or an anti-oxidant.

16. A process for the preparation of a powdered creamer, which comprises:

forming a solution or emulsion of a sweetener, a water-dispersible or water-soluble protein and an edible oil having a bland flavor and a melting point below 10° C.;

injecting a gas into the solution or emulsion;

drying the gas-containing solution or emulsion to form creamer particles; and agglomerating the creamer particles to provide a powdered creamer having entrapped gas in an amount effective to cause foaming upon dissolution of the powdered creamer.

17. The process of claim 16, which further comprises pasteurizing and homogenizing the solution or emulsion prior to injecting the gas.

18. The process of claim 16, wherein the particles are agglomerated to a particle size of greater than about 1.5 mm.

19. The process of claim 16, which further comprises spraying an emulsifier onto the particles prior to of after the agglomerating step.

* * * * *

UNITED STATES PATENT AND TRADEMARK OFFICE
CERTIFICATE OF CORRECTION

PATENT NO.    : 6,287,616 B1
DATED         : September 11, 2001
INVENTOR(S)   : Beeson et al.

It is certified that error appears in the above-identified patent and that said Letters Patent is hereby corrected as shown below:

<u>Column 8,</u>
Line 23, change "caboxylic" to -- carboxylic --
Line 25, change "di-glycericde" to -- di-glyceride --
Line 33, change "tararic" to -- tartaric --
Line 43, after "one", change "of" to -- or --
Line 64, after "to", change "of" to -- or --

Signed and Sealed this

Twelfth Day of March, 2002

*Attest:*

*Attesting Officer*

JAMES E. ROGAN
*Director of the United States Patent and Trademark Office*